United States Patent [19]

Baumgartner

[11] 4,043,672

[45] Aug. 23, 1977

[54] METHOD AND APPARATUS FOR DETECTING THE DIRECTION OF INCIDENCE OF ELECTROMAGNETIC RADIATION

[75] Inventor: Viktor Baumgartner, Taufkirchen, Germany

[73] Assignee: Siemens Aktiengesellschaft, Berlin and Munich, Germany

[21] Appl. No.: 705,707

[22] Filed: July 15, 1976

[30] Foreign Application Priority Data

July 25, 1975 Germany .............................. 2533214

[51] Int. Cl.² ........................................... G01B 11/26
[52] U.S. Cl. ..................................... 356/152; 350/21; 350/22; 356/141; 358/87; 358/108; 343/117 R
[58] Field of Search ........................ 358/108, 103, 87; 356/152, 141, 144–146; 350/21, 22; 89/41 L; 343/117 R

[56] References Cited

U.S. PATENT DOCUMENTS

| | | | |
|---|---|---|---|
| 3,147,384 | 9/1964 | Fenton et al. | 356/141 X |
| 3,448,272 | 6/1969 | Slater | 356/152 X |
| 3,505,465 | 4/1970 | Rees | 350/21 X |
| 3,865,491 | 2/1975 | Hogan | 356/152 |
| 3,881,824 | 5/1975 | Higgins | 356/152 X |

FOREIGN PATENT DOCUMENTS

| | | | |
|---|---|---|---|
| 2,212,306 | 9/1973 | Germany | 350/21 |
| 283,493 | 4/1915 | Germany | 350/21 |
| 1,152,709 | 5/1969 | United Kingdom | 356/152 |

*Primary Examiner*—S.C. Buczinski
*Attorney, Agent, or Firm*—Hill, Gross, Simpson, Van Santen, Steadman, Chiara & Simpson

[57] ABSTRACT

Two optical receiving systems for electromagnetic radiation are provided with separate detectors. The systems are essentially coaxial with the outer system being fixed and the inner system being rotatable. The outer receiving system carries out a first detection of the angle of incidence of the electromagnetic radiation with the help of several detectors, as a panoramic optical system. Then, on the basis of the angle of incidence obtained in this manner, the inner optical system is coarsely positioned to the direction of incidence of the electromagnetic radiation. A fine follow up is then carried out with the help of the inner optical receiving system, the inner system being provided with a smaller receiving opening, and with the help of one or more further detectors in order to obtain the exact direction of incidence.

24 Claims, 3 Drawing Figures

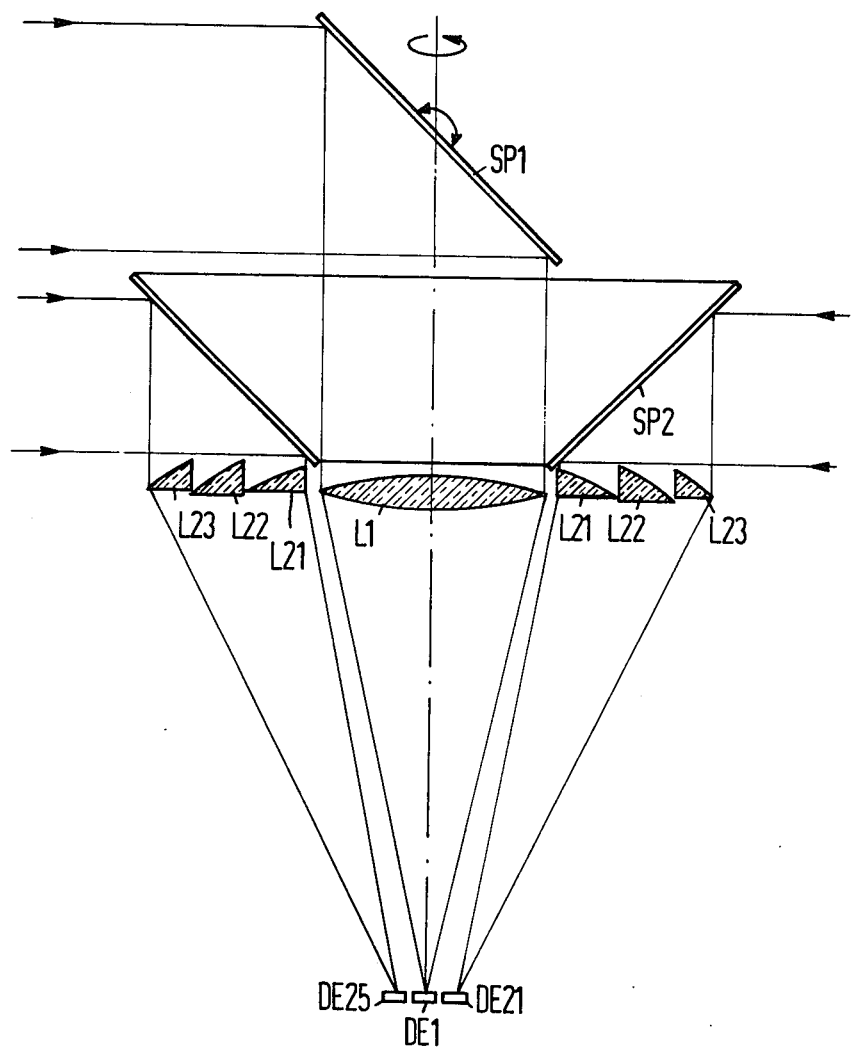

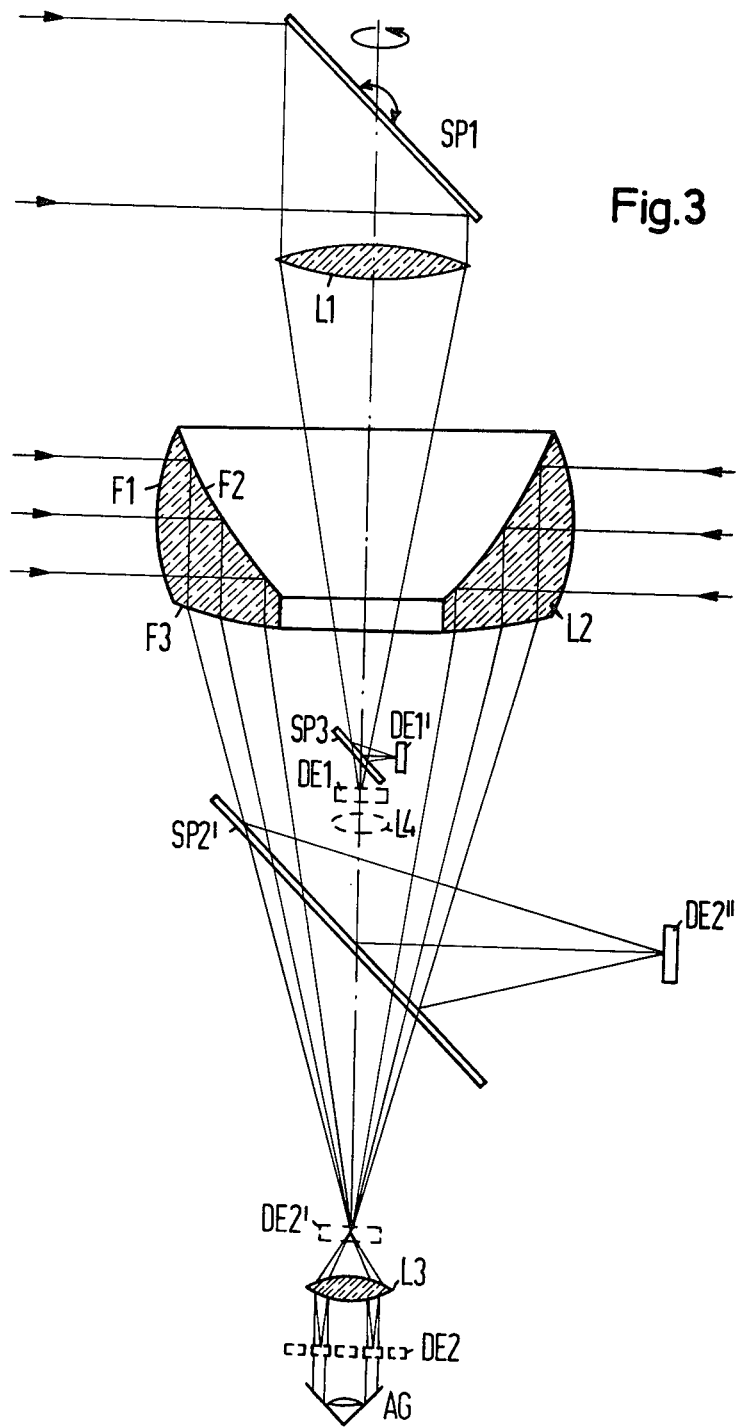

4,043,672

METHOD AND APPARATUS FOR DETECTING THE DIRECTION OF INCIDENCE OF ELECTROMAGNETIC RADIATION

BACKGROUND OF THE INVENTION

1. Field of the Invention

This invention relates to a method and apparatus for detecting the direction of incidence of electromagnetic radiation with the help of two optical receiving systems which operate with separate detectors, the outer system being fixed and the inner system being rotatable.

2. Description of the Prior Art

The allowed German patent application No. 1,548,421 discloses a device for detecting electromagnetic radiation and for determining its direction of incidence. Circular sensing is effected with the help of a rotating mirror and an associated first optical receiving system, and this arrangement serves for detecting radiation in the visible and/or infrared range. A further optical receiving system, consisting of laser detectors arranged in a ring, serves for detecting radiation in the laser frequency range. The laser detectors thus surround the optical system approximately in the configuration of a ring, whereby this system serves for detecting the visible and/or infrared radiation range. A device for detecting electromagnetic radiation and for identifying its direction of incidence is disclosed in that a system for an automatic panoramic directional finding for electromagnetic radiation of the visible and/or infrared spectrum range comprises an optical receiving system sensing the horizon by way of rotation, automatic panoramic direction finding being per se well known in the art. The system is placed in a common housing together with several fixed laser radiation detectors which are arranged in a ring about the vertical axis of the rotational optical receiving system, but outside of the range thereof. An indicator is provided for indicating the direction of incidence of the visible and/or infrared radiation, the indicator rotating in synchronism with the rotating optical receiving system and provided with a rotatable member within a compass rose (scale), while an indicator of the direction of incidence of laser radiation is provided upon a ring-shaped scale which is concentric about the compass rose and which is subdivided into sections corresponding to the respective orientation of the different laser detectors.

Since the modern electro-optical locating methods, follow-up methods and search methods to a great extent operate with individual pulses or with pulse trains of very short durations, respectively, it is a fact that search systems which sense the azimuth of a pivotable mirror arrangement do not offer sufficient guarantee that targets are actually detected. Therefore, it must be required in an all-around direction finding arrangement that the arrangement is always ready to receive when a safe target detection is to be guaranteed. On the other hand, such a receiving system continuously searching all around does not provide sufficiently accurate target resolution, or expressed differently, sufficiently accurate detection of the direction of incidence of electromagnetic radiation.

SUMMARY OF THE INVENTION

The object of the present invention is to provide techniques which permit compliance with both of the above demands with the help of a single device.

According to the invention, the foregoing object is attained, in a device of the initially mentioned kind, in that two optical receiving systems are arranged coaxially to one another, that the outer optical receiving system carries out a first detection of the angle of incidence of the electromagnetic radiation, with the help of several detectors, as a panoramic optical system, that on the basis of the angle of incidence obtained in this manner the inner receiving system is coarsely positioned onto the direction of incidence of the electromagnetic radiation, and that in a fine follow-up to the exact direction of incidence is carried out with the inner optical receiving system which is provided with a small receiving opening, with the help of one or more additional detectors.

Since the outer optical receiving system carries out a continuous detection of the direction of incidence of the electromagnetic radiation, it is guaranteed that the azimuth angle range which is to be detected is constantly supervised. Therefore, it is possible to detect even very short time pulses of electromagnetic radiation. On the other hand, a safe and accurate follow-up of this optical receiving system to the exact direction of incidence is possible due to the passage of the radiation onto the inner optical receiving system having the smaller receiving opening.

BRIEF DESCRIPTION OF THE DRAWINGS

Other objects, features and advantages of the invention, its organization, construction and operation will be best understood from the following detailed description taken in conjunction with the accompanying drawings, on which:

FIG. 2 is a schematic representation of a detection system constructed in accordance with the invention and employing a Fresnel optical system; and FIG. 3 is a schematic representation of a detection system constructed in accordance with the invention and employing an annular, ring-shaped picture lens.

DESCRIPTION OF THE PREFERRED EMBODIMENTS

Figure 1:
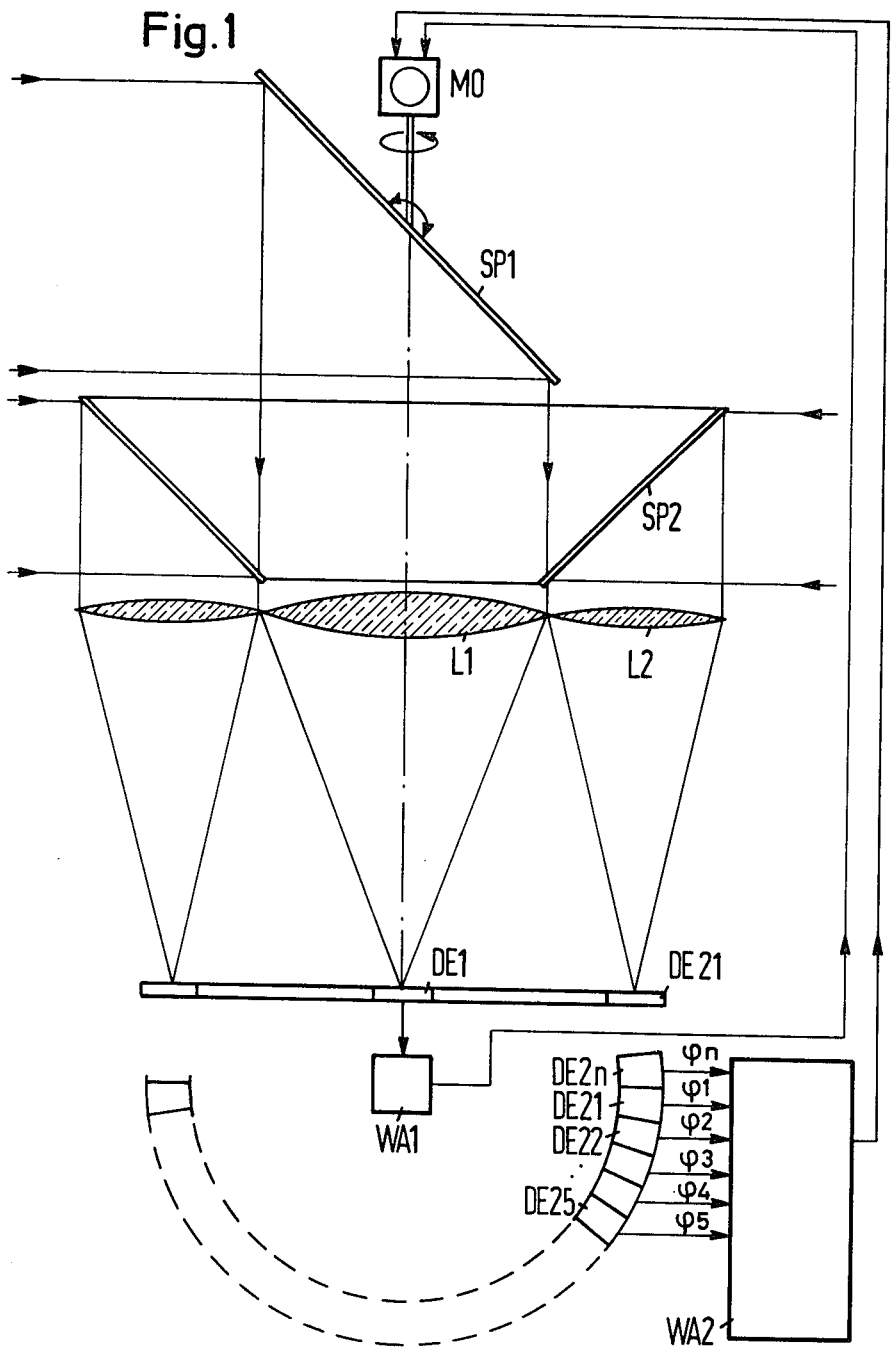
FIG. 1 is a schematic illustration of a detection system constructed in accordance with the present invention and employing a torus lens.

Referring first to FIG. 1, an inner optical receiving system comprises a mirror SP1, a lens L1 illustrated in section, and one or more receiving detectors DE1 arranged, for example, in a matrix configuration.

An outer optical receiving system comprises a mirror SP2, a torus lens L2 illustrated in section, and a plurality of detectors DE21 DE2$n$ arranged in a ring and also illustrated in a plan view. The mirror SP2 has the shape of a frustum whose outer inclined surface is mirrored. A correspondingly large surface is provided in the center through which the radiation of the inner optical receiving system can pass from the mirror SP1 toward the lens L1.

As seen on the drawing, and as discussed above, the two optical receiving systems are thus arranged coaxially to one another. The incident radiation which may arrive from a particular azimuth angle direction, is guided toward the ring-shaped detector arrangement DE21 through DE2$n$, by way of the mirror SP2 and the torus lens L2. Each one of these detectors detects a certain angle range; these ranges are denoted by $\phi 1$ through $\phi n$. Due to a correspondingly fine quantizing of the angle ranges, a sufficiently accurate first detection of the direction of incidence of radiation can be carried out. The outputs of the individual detectors DE21 through DE2n are connected to an angle evaluation system WA2. This angle evaulation system supplies a control voltage which is fed to a servomotor MO. The servomotor MO moves the mirror SP1 into that azimuth angle direction from which the radiation arrived, as detected by the outer receiving sysem. WA2 is a counter, starting at $\phi 1$ and counting up to $\phi x$, where $\phi x$ is the angle corresponding to the detector DE2x, which delivers an output signal. The control voltage for the servomotor MO is proportional to the counting value of the counter in WA2.

After carrying out this course of adjustment on the basis of the angle information from the outer second optical receiving system, a further fine adjustment of the first inner optical receiving system will occur with the help of the angle evaluating system WA1 which obtains its information from the DE1 (or a plurality of such detectors DE1). Thus, the accurate directioning of the mirror SP1 into the desired azimuth direction is carried out. This positioning can be effected in a simple manner in such a way that a pivoting movement into a given azimuth range, such as $\pm 2°$ is carried out. During this scanning process, output voltages will result at the detector DE1, which first of all increase, then reaching maximum value, and finally decrease again. That angle value at which the maximum output voltage has been reached is maintained in the angle evaluation system WA1 and used as a regulated quantity for the accurate positioning of the mirror SP1. However, it is also possible, for example in the case of a matrix-like arrangement of several detectors DE1 through DEm, to determine the direction of incidence accurately by way of evaluating the effectively different output voltages.

Supplementary to the rotary movement about the axis of the motor MO, a tilting movement of the mirror SP1 may be provided. This tilting movement permits a better detection of targets at a certain height.

A more accurate target-center determination may furthermore also be effected at the detectors DE21 through DE2n of the outer optical receiving system. For this purpose, the output voltages of adjacent detectors may be compared with one another, whereby that detector range is used as the angle of incidence which supplies the highest output voltage.

In order to eliminate spheric abberrations at the torus lens L2, an aspheric surface is advantageously used, in particular a parabola. This may be realized by way of a corresponding shaping of a surface of the torus lens and/or by way of a corresponding shaping of the mirror SP2.

The inner optical receiving system, comprising the mirror SP1 and the lens L1, has an extremely small receiving opening. As compared thereto, the outer optical receiving system, comprising the mirror SP2 and the lens L2, has a very large receiving opening.

In the case of a detection system constructed in accordance with FIG. 2, two mirrors SP1 and SP2, as well as the lens L1 in accordance with FIG. 1, are also present. The design of the inner optical receiving system is thus unchanged. As opposed to this, however, several concentric, ring-shaped lens systems L21, L22, L23, are provided for the outer optical receiving system in the place of the torus lens L2 of FIG. 1. These lens systems form a so-called fresnel optical system. These fresnel lenses permit a more simple and more compact design and an extensive correction of spheric abberrations. Furthermore, a particularly good adaptation to the detectors DE21 through DE2n is possible since the spheric abberrations can be corrected while being separated into sub-ranges. These detectors may thereby be drawn inwardly essentially much further than in the case of the arrangement constructed in accordance with FIG. 1. This permits the arrangement of the detector DE1 (or the detectors DE1-DEm) and the ring-shaped detectors DE21 through DE2n upon a single individual substrate and thus a decrease in volume.

The evaluation of the received signals of the outer optical receiving system, and the subsequent control of the mirror SP1 are effected in an analogous manner as described and shown with respect to the apparatus of FIG. 1. The individual control lines have been omitted in FIG. 2 in order to simplify the drawing.

Referring now to FIG. 3, an arrangement is illustrated in which a mirror SP1 and a lens L1 are designed in an analogous manner as in the apparatus of FIGS. 1 and 2. A change is only provided insofar as the lens L1 is positioned ahead of the lens L2. This arrangement, however, remains coaxial to a great extent, displacement being only in the axial direction. Therefore, the picture planes of both lenses are drawn apart. The detector DE1 is closer to the lens systems L2. With the help of a partially permeable mirror SP3, a portion of the incident radiation of the inner optical system can be deflected onto a further detector (or further detectors) DE1'. Then, the detector DE1 can be omitted and therefore the path for the beam entrance is free in the axis of the system.

The lens L2 is, in the apparatus of FIG. 3, embodied as an annular ring-shaped picture lens having a central opening. The lens L2 has an inner mirrored surface F2 in the form of a rotation hyperbold. The lens L2 includes two further surfaces F1 and F3 which are not mirrored. These surfaces are arcuate surfaces, whereby radii fix the focal point with the opening. A partially permeable mirror S2' is arranged in the beam path behind the lens system L2. The mirror S2' conducts a part of the incident radiation to a detector arrangement DE2'' positioned outside of the beam path, along the axis of the system. Otherwise, the radiation will reach a further detector DE2'. When the detector DE2' is omitted, the path in the axis is also free for the radiation. A lens L3 and a further ring-shaped detector arrangement DE2 is provided in the beam path.

When the detectors DE2, DE2' and DE1 are omitted, and instead, the radiation is laterally mirrored by way of the partially permeable mirrors SP2' and SP3, then the arrangement, as indicated by the eye AG, may be simultaneously used as a circular view telescope (periscope). The lens L3 in this case, is the ocular system of the telescope and a lens L4 (shown in broken lines) constructs the image and produces the geometrically correct intermediate representation.

In addition to the direction selective detection in the case of the detector arrangement DE2, there is also the possibility of carrying out an integral detection of the entire ring picture in the detector DE2''. The deflection due to the mirror SP2' also serves for this purpose. This arrangement thus entails an increased safety in target discovery and target detection.

The arrangements constructed in accordance with FIGS. 1 and 2 may also be embodied as periscopes by way of corresponding deflection mirrors in a manner analogous to that illustrated in FIG. 3. The mirrors SP2' and SP3 may advantageously contain a frequency-selective mirror system. Thus, the range, which is to be measured in the case of incident light, is separated from the visible spectrum range. Therefore, a protection for the eye is provided in addition, since only the visible portion reaches the eye as represented at AG. In order to decrease acceleration moments, the mirror SP1 may advantageously be embodied as a polygonal mirror. It is also possible to arrange this mirror only in the previously focused beam path, i.e. after the lens L1. This has the advantage that only a very small mirror is required.

Although I have described my invention by reference to specific illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of detecting the direction of incidence of electromagnetic radiation with the help of two coaxial optical receiving systems a first one of which is fixed and the other one of which is rotatable, comprising the steps of:
   receiving and detecting the general angle of incidence of electromagnetic radiation with the first receiving system;
   coarsely rotating the other receiving system to the general angle of incidence;
   directionally receiving and detecting the angle of incidence with the other receiving system; and
   accurately positioning the other receiving system, as a fine adjustment, to the angle of incidence.

2. The method of claim 1, comprising the steps of: comparing the signals received by said two receiving systems and determining the angle of incidence from the strongest incident signal.

3. Apparatus for detecting the angle of incidence of electromagnetic radiation, comprising:
   a panoramic first optical receiver for receiving radiation;
   first detection means optically coupled to said first optical receiver and responsive to the received radiation to produce a coarse adjustment signal indicative of the angle of incidence;
   a rotatable directional second optical receiver arranged coaxially with respect to said first optical receiver;
   rotation means connected to said first detection means and to said second optical receiver, and responsive to said coarse adjustment signal to rotate said second optical receiver toward the incident radiation; and
   second detection means optically coupled to said second optical receiver and electrically connected to said rotation means, said second detection means responsive to the received radiation to produce a fine adjustment signal to operate said rotation means for follow-up rotation of said second optical receiver to the exact angle of incidence.

4. The apparatus of claim 3, wherein said first detection means includes a plurality of signal producing detectors and comparison means for comparing said detector signals with each other and providing the adjustment signal on the basis of the strongest detector signal.

5. The apparatus of claim 3, wherein said second detection means includes a plurality of signal producing detectors and comparison means for comparing said detector signals with each other and providing the adjustment signal on the basis of the strongest detector signal.

6. The apparatus of claim 3, wherein said first panoramic optical receiver comprises a conically-shaped mirror.

7. The apparatus of claim 6, wherein said conically shaped mirror has a central opening and is embodied as a conical frustrum, and said second optical receiver is optically coupled to said second detection means over a beam path extending through the central opening.

8. The apparatus of claim 6, wherein said first optical receiver further comprises
   a torus lens optically coupled to said conically-shaped mirror and to said first detection means.

9. The apparatus of claim 6, wherein said torus lens and said conically-shaped mirror have surfaces in the beam path to said first detection means, at least one of said surfaces being aspheric to prevent spheric abberrations.

10. The apparatus of claim 9, wherein said aspheric surface is parabolic.

11. The apparatus of claim 6, wherein said first optical receiver further comprises
    a Fresnel lens system optically coupled to said conically-shaped mirror and to said first detection means.

12. The apparatus of claim 11, wherein said Fresnel lens system and said conically-shaped mirror each comprise a central opening for receiving a beam path therethrough coupling said second optical receiver and said second detection means.

13. The apparatus of claim 11, comprising a single substrate supporting said first and second detection means.

14. The apparatus of claim 3, wherein said first optical receiver comprises
    a ring-shaped lens including a mirrored inner surface.

15. The apparatus of claim 14, wherein said ring-shaped lens also includes a pair of spherically arcuate surfaces, and wherein said mirrored inner surface is in the form of a rotation hyperboloid.

16. The apparatus of claim 3, wherein said first detection means includes axially positioned detection means and radially positioned detection means.

17. The apparatus of claim 16, comprising
    a semipermeable mirror disposed to split the beam between said first receiver and said first detection means so as to be received by said axially and radially positioned detectors.

18. The apparatus of claim 3, comprising:
    a optical system optically coupled to said second optical receiver along a defined beam path; and
    an ocular system on the defined beam path optically coupled to said optical system, said optical and ocular systems constituting a periscope.

19. The apparatus of claim 18, comprising
    a pair of semipermeable mirrors disposed on the defined beam path to radially deflect the incident radiation received by said first and second optical receivers, said first and second detection means located radially of the beam path to receive the respective radiation so split.

20. The apparatus of claim 19, wherein said mirrors are frequency selective mirrors.

21. The apparatus of claim 3, wherein said second optical receiver comprises a rotatably mounted mirror positioned at an angle to deflect incident radiation along the common axis of said receivers.

22. The apparatus of claim 21, wherein said mirror is a polygonal mirror.

23. The apparatus of claim 21, wherein said mirror is very small in azimuthal receiving area in comparison to the circular receiving area of said first optical receiver.

24. Apparatus for detecting the angle of incidence of a beam of electromagnetic radiation, comprising:
- a fixed panoramic optical receiver for receiving the incident beam;
- a directional, rotatable optical receiver coaxial with said panoramic receiver, each of said receivers including means for directing the received beam to respective points along their common axis;
- motor means for rotating said rotatable optical receiver about said axis; and
- control means connected to said motor means including first means optically coupled to a first of said points along the beam path and causing a coarse rotational adjustment of said rotatable optical receiver, and second means optically coupled to the second of said points along the beam path and causing a fine rotational adjustment of said rotatable optical receiver.

* * * * *